(12) United States Patent
Gretz

(10) Patent No.: US 10,468,863 B1
(45) Date of Patent: Nov. 5, 2019

(54) DUPLEX ELECTRICAL CONNECTOR WITH ONE-PIECE CONNECTOR BODY

(75) Inventor: Thomas J. Gretz, Port St. Lucie, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 0 days.

(21) Appl. No.: 12/384,467

(22) Filed: Apr. 3, 2009

Related U.S. Application Data

(63) Continuation-in-part of application No. 12/080,482, filed on Apr. 3, 2008, now Pat. No. 7,882,886.

(51) Int. Cl.
*H02G 3/08* (2006.01)

(52) U.S. Cl.
CPC .................................. *H02G 3/083* (2013.01)

(58) Field of Classification Search
CPC .............................. H02G 3/121; H02G 3/083
USPC ............... 174/666, 650, 656, 659, 557, 660; 439/557
See application file for complete search history.

(56) References Cited

U.S. PATENT DOCUMENTS

| | | |
|---|---|---|
| 1,295,304 A | 2/1919 | Grindle |
| 1,328,290 A | 1/1920 | Overbagh |
| 2,084,961 A | 6/1937 | Bondeson |
| 2,352,306 A * | 6/1944 | Anderson ..................... 228/125 |
| 2,744,769 A | 5/1956 | Roeder |
| 3,138,827 A * | 6/1964 | Hamilton ...................... 249/145 |
| 4,885,429 A | 12/1989 | Schnittker |
| 6,352,439 B1 * | 3/2002 | Stark et al. ................... 439/142 |
| 6,521,831 B1 | 2/2003 | Gretz |
| 6,682,355 B1 * | 1/2004 | Gretz .............................. 439/98 |
| 7,151,223 B2 | 12/2006 | Auray et al. |
| 7,238,894 B1 * | 7/2007 | Gretz ............................ 174/655 |
| 7,358,448 B2 | 4/2008 | Auray et al. |
| 7,488,905 B2 | 2/2009 | Kiely et al. |
| 7,723,623 B2 * | 5/2010 | Kiely et al. .................. 174/666 |
| 2004/0244937 A1 * | 12/2004 | Pollak et al. ................. 164/137 |
| 2007/0221359 A1 | 9/2007 | Reilly |

OTHER PUBLICATIONS

ASM Int'l, Tool Materials, J.R. Davis ed., pp. 251-258 and cover title, notice, and table of contents pages.

\* cited by examiner

*Primary Examiner* — David M Sinclair
*Assistant Examiner* — Theron S Milliser

(57) ABSTRACT

A duplex electrical connector having a one-piece connector body for securing electrical cables to a panel or junction box. The one-piece connector body includes a leading end with a nose portion having a bore therein and a trailing end with two bores therein. One or two tubular cable retainers secured in the trailing end enable snap in connection of electrical cables to the trailing end of the connector body. A fastening arrangement is included on the nose portion at the leading end of the connector body for securing the connector body to a knockout hole in a panel or an electrical box.

9 Claims, 8 Drawing Sheets

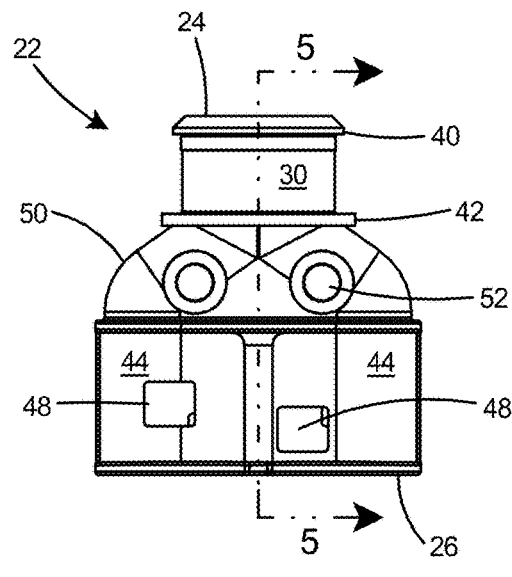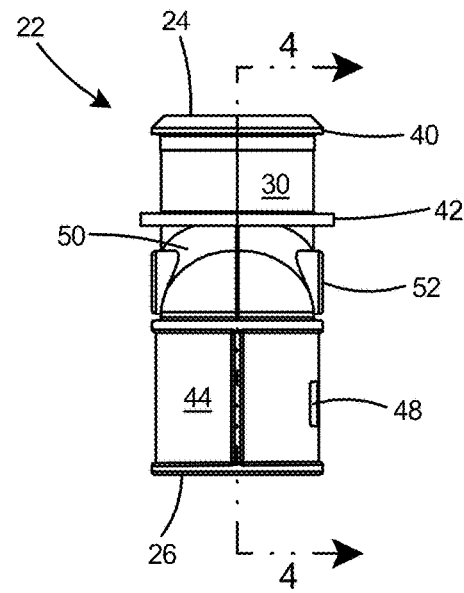
Fig. 2  Fig. 3
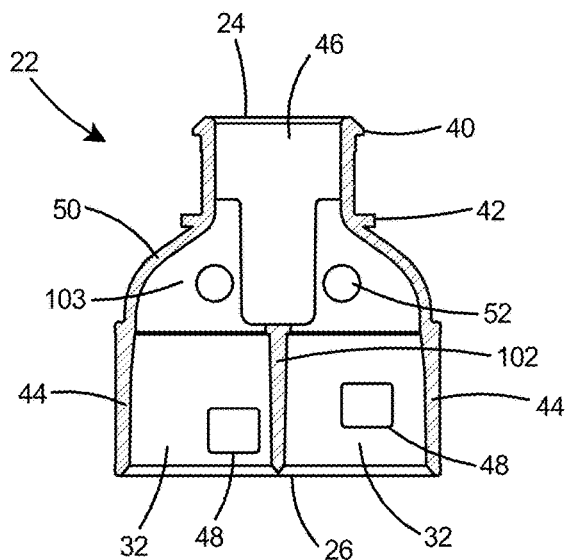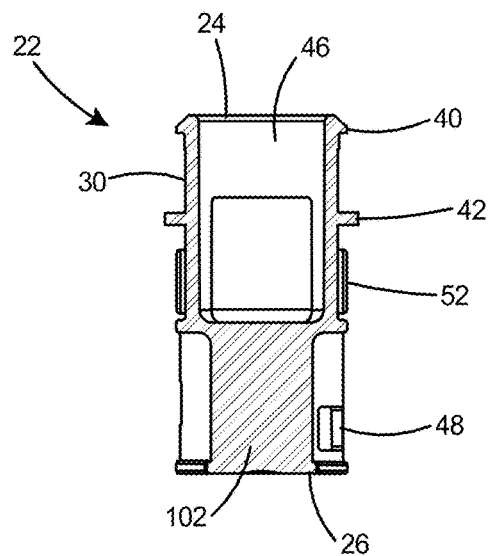
Fig. 4  Fig. 5

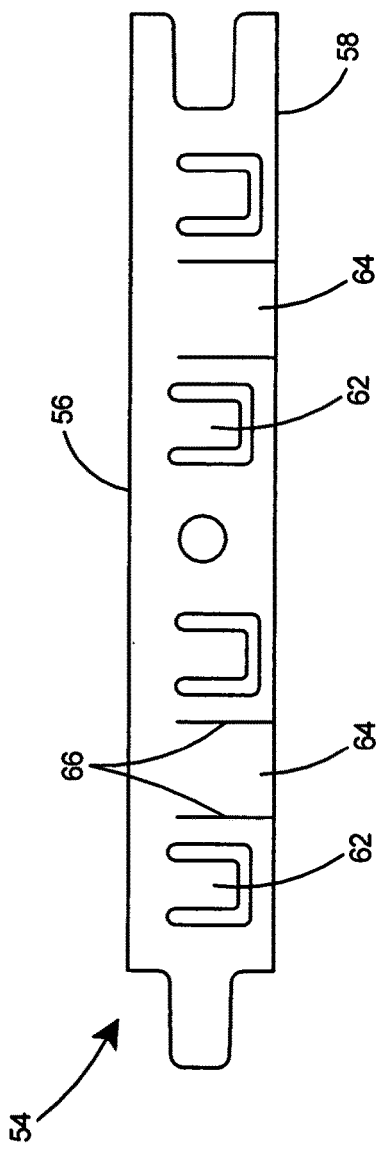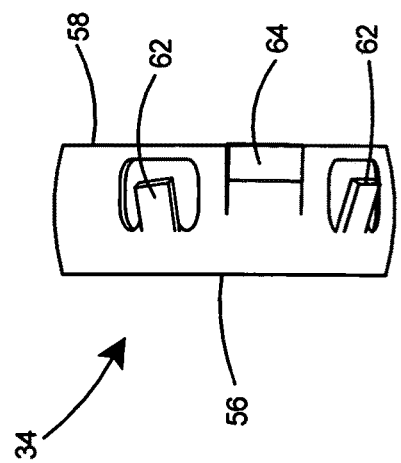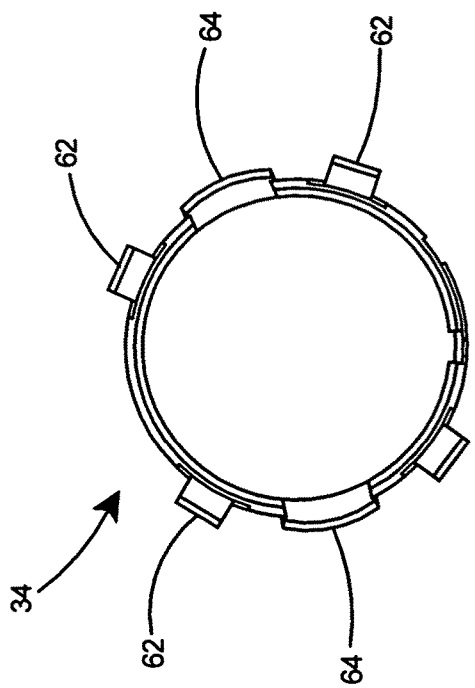

DUPLEX ELECTRICAL CONNECTOR WITH ONE-PIECE CONNECTOR BODY

This application is a Continuation In Part of U.S. patent application Ser. No. 12/080,482, filed Apr. 3, 2008, now U.S. Pat. No. 7,882,886, which is commonly owned by the assignee of the present invention and the entire contents of which are incorporated herein by reference.

FIELD OF THE INVENTION

This invention relates to connectors for connecting electrical cables to a panel and specifically to a duplex electrical connector or fitting having a one-piece connector body.

BACKGROUND OF THE INVENTION

The current invention is a duplex electrical connector that includes a one-piece connector body. U.S. patent application Ser. No. 12/080,482, filed Apr. 3, 2008, now U.S. Pat. No. 7,882,886, which has been incorporated herein by reference thereto, disclosed a coring system and method for manufacturing a one-piece die cast electrical connector body. The coring system significantly simplified the steps required to produce a duplex electrical connector as it enabled the connector body to be produced in one die-casting operation instead of two and it completely eliminated secondary manufacturing steps such as the securing together of two separate parts in order to form the connector body. By producing a connector body in one-piece, the coring system eliminated the undesirable and dangerous flash which is inherent in conventional two-piece metal die-cast connector bodies which pieces are subsequently joined together to form the connector body. With reference to FIGS. 17 and 18, the coring system 5 includes a first core 6, a second core 7, and a connecting arrangement 8 for connecting the first and second cores in such a manner that there are no gaps between the joined portions of the two cores. FIG. 19 depicts a die cast molding process 9 using the coring system 5 of the present invention. The die cast process includes a left hand die 10, a right hand die 11, a stripper plate 12, and the coring system 5 of the present invention including the first core 6 and the second core 7. When the cores 6 and 7 of the coring system 5 are joined together by the connecting arrangement 8 and placed in a mold 13 formed by dies 10 and 11, molten metal may be introduced to the mold at the joined area of the two core pieces 6 and 7 to form a one-piece flash-free connector body 22 according to the present invention. The first core 6 includes a base portion 14 with a tubular nose portion 15 extending there from. The nose portion 15 of the first core 6 includes a narrowed end portion 16. The second core 7 includes a base portion 17 and two parallel and generally tubular fingers 18, extending from the base portion 17.

The present invention is an improved duplex electrical connector that includes a one-piece die cast connector body produced according to the method disclosed in U.S. patent application Ser. No. 12/080,482. The duplex electrical connector with one-piece connector body includes an improved one-piece connector body that significantly reduces production steps and time and eliminates the possibility of flash in the interior of the connector.

SUMMARY OF THE INVENTION

The invention is a duplex electrical connector having a one-piece connector body for securing electrical cables to a panel or junction box. The one-piece connector body includes a leading end with a nose portion having a bore therein and a trailing end with two bores therein. One or two tubular cable retainers secured in the trailing end enable snap in connection of electrical cables to the trailing end of the connector body. A fastening arrangement is included on the nose portion at the leading end of the connector body for securing the connector body to a knockout hole in a panel or an electrical box.

OBJECTS AND ADVANTAGES

Several advantages are achieved with the duplex electrical connector with one-piece connector body of the present invention, including:

(1) As a result of the one-piece construction, there is an approximate 50% savings in raw material cost per electrical connector, thereby enabling the duplex electrical connector to be produced at a significantly lower cost than conventional two-piece connector bodies.

(2) Use of one-piece construction for the connector body eliminates secondary manufacturing steps, such as a machine operation for joining the separate pieces of a conventional two-piece connector body, thereby significantly reducing manufacturing time and cost.

(3) Die casting the duplex connector body in one-piece eliminates flash in the interior of the fitting. Flash is an undesirable byproduct of the die casting process that is detrimental to the operation of an electrical connector as it is sharp-edged and can cut electrical cables that are later inserted into the electrical connector.

(4) By eliminating flash, the one-piece duplex connector body eliminates a costly intermediate manufacturing step wherein chamfering is required to remove the flash.

(5) Die casting the connector body in one piece ensures there is good electrical continuity throughout the connector body. This eliminates the worry of establishing proper electrical continuity between the two pieces of a conventional connector body.

(6) Several secondary manufacturing operations, including the securing together of two separate parts to form the duplex connector body, are eliminated.

(7) The entire duplex connector body is produced in a single casting operation, rather than casting two separate parts as in prior art connector bodies, thereby reducing cost and complexity of manufacture.

(8) Much less tooling is required to produce the duplex connector body of the present invention.

(9) As a result of a one-piece casting procedure, the connector body is die cast with much thinner walls than prior art two piece connector bodies thereby reducing raw material costs.

(10) As a result of the one-piece connector body, better electrical continuity is achieved throughout the electrical connector or fitting.

These and other objects and advantages of the present invention will be better understood by reading the following description along with reference to the drawings.

DESCRIPTION OF THE DRAWINGS

FIG. 2 is a top view of a one-piece connector body that forms a portion of the duplex electrical connector shown in FIG. 1.

FIG. 3 is a side view of the connector body of FIG. 2.

FIG. 4 is a sectional view of the connector body taken along line 4-4 of FIG. 3.

FIG. 5 is a sectional view of the connector body taken along line 5-5 of FIG. 2.

FIG. 6 is a plan view of a blank used to form a cylindrical snap ring fastening arrangement for the leading end of the connector body in FIG. 2.

FIG. 7 is an end view of a cylindrical snap ring that has been formed from the blank of FIG. 6.

FIG. 8 is a side view of the cylindrical snap ring of FIG. 7.

Figure 1:
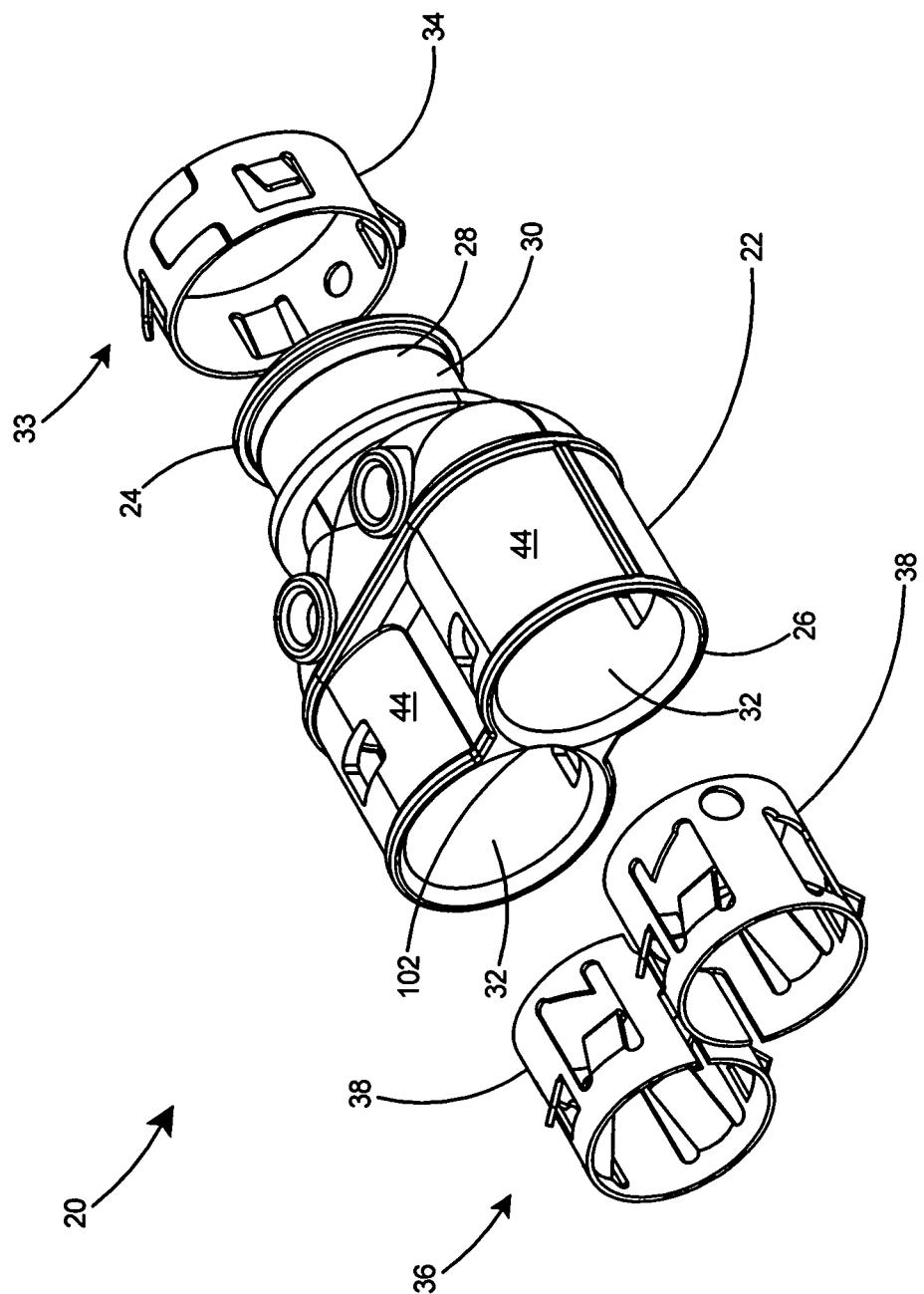
FIG. 1 is an exploded perspective view of the preferred embodiment of a duplex electrical connector according to the present invention.

INDEX TO REFERENCE NUMERALS IN DRAWINGS 5 coring system
6 first core
7 second core
8 connecting arrangement
9 die-cast molding process
10 left hand die
11 right hand die
13 mold
14 base portion of first core
15 tubular nose portion of first core
16 narrowed end portion of first core
17 base portion of second core
18 tubular fingers of second core
20 duplex electrical connector, preferred embodiment
22 one-piece connector body
24 leading end
26 trailing end
28 nose portion
30 cylindrical seat
32 bore in trailing end of connector body
33 fastening arrangement
34 snap ring
36 cable retaining arrangement
38 cable retaining ring
40 end flange
42 intermediate flange
44 cylindrical wall portion
46 leading bore
48 opening
50 curved shoulder
52 viewport
54 snap ring blank
56 leading edge of snap ring
58 trailing edge of snap ring
60 U-shaped cutout
62 locking tang
64 grounding tang
66 slit
68 cable retaining ring blank
70 leading edge of cable retaining ring
72 trailing edge of cable retaining ring
74 slot
76 center cable retaining tang
78 outer cable retaining tang
80 edge of center cable retaining tang
82 edge of outer cable retaining tang
84 U-shaped slot
86 outward extending tang
88 aperture
90 tab
92 groove
94 bend line
96 cable direction point
98 end portion of cable retaining tang
99 base portion of cable retaining tang
100 sidewall of cable retaining ring
102 dividing wall portion
103 interior of the connector body
104 electrical cable
106 knockout aperture
108 electrical panel
110 duplex electrical connector, alternate embodiment
112 one-piece connector body
114 threads
116 locknut
Θ1 angle of edge of cable retaining tang with respect to leading edge
Θ2 angle of end portion with respect to cable retaining tang
Θ3 angle of cable retaining tang with respect to ring sidewall

DETAILED DESCRIPTION OF THE INVENTION

With reference to FIG. 1 there is shown a preferred embodiment of the present invention, a duplex electrical connector 20 with a one-piece die cast connector body 22 having a leading end 24, a trailing end 26, a nose portion 28 with a cylindrical seat 30 on the leading end 24, and two bores 32 in the trailing end 26. A fastening arrangement 33 for fastening the electrical connector 20 to an electrical panel or junction box (not shown) includes a snap ring 34 that is shown exploded away from the leading end 24 and in alignment with the nose portion 28 and the cylindrical seat 30. A cable retaining arrangement 36 includes two cable retaining split rings 38 that are shown exploded away from the trailing end 26 of the connector body 22 with a cable retaining ring 38 in alignment with each of the bores 32 in the trailing end 26.

Referring to FIGS. 2-5, the one-piece die cast connector body 22 is die cast in one piece of metal. The connector body 22 includes an end flange 40 on the leading end 24 and an intermediate flange 42 at the end of the nose portion 28. The cylindrical seat 30 extends between the end flange 40 and the intermediate flange 42. The trailing end 26 of the connector body 22 includes a pair of substantially cylindrical wall portions 44 that define the bores 32. As shown in FIG. 4, the connector body 22 is substantially hollow with bores 32 in open communication with leading bore 46 in the leading end 24 of the connector body. Openings 48 are provided in the cylindrical wall portions 44 surrounding each bore 32. Curved shoulders 50 are provided at the transition of the trailing bores 32 to the leading bore 46. Viewports 52 are provided in the shoulder area as shown in FIG. 2.

Referring to FIGS. 6-8, the cylindrical snap ring 34 of the preferred embodiment is a split ring formed from a blank 54 having a leading edge 56 and a trailing edge 58, as shown in FIG. 6, into a substantially cylindrical shape as shown in FIGS. 7 and 8. U-shaped cutouts 60 are punched out of the blank 54 to form locking tangs 62 on the interior of the blank 54. Grounding tangs 64 are defined by slits 66 along the trailing edge 58 of the blank 54. On the cylindrical snap ring 34, as shown in FIGS. 7 and 8, the locking tangs 62 and grounding tangs 64 are bent outwards of the ring 34.

Figure 9:
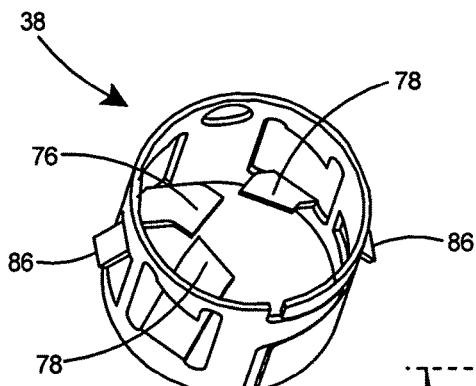
FIG. 9 is a perspective view of a cable retainer that forms a portion of the duplex electrical connector of the present invention.
Figure 10:
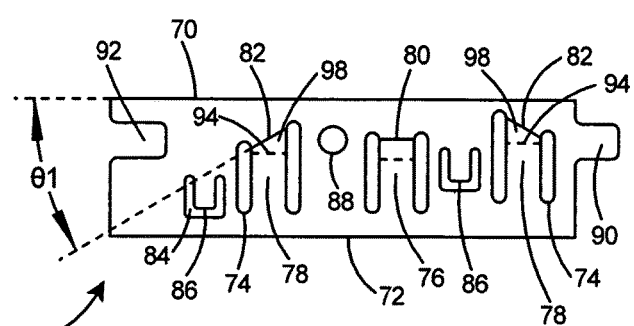
FIG. 10 is a plan view of a blank used to form the cable retainer of FIG. 2.
Figure 11:
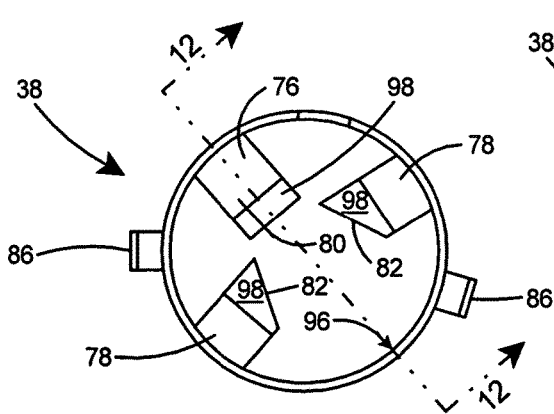
FIG. 11 is an end view of the cable retainer of FIG. 9.
Figure 12:
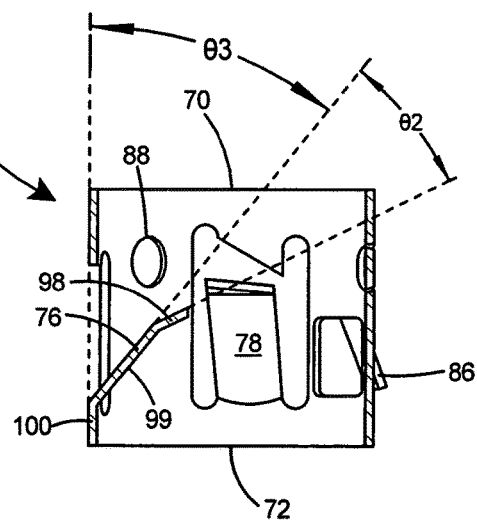
FIG. 12 is a sectional view of the cable retainer taken along line 12-12 of FIG. 11.

With reference to FIGS. 9 and 11-12, there is shown a cable retaining ring 38 that forms a portion of the duplex connector of the present invention. As shown in FIG. 10, the cable retaining ring is formed from a blank 68 having a leading edge 70 and a trailing edge 72. Slots 74 define cable retaining tangs in the blank 68 including a center cable retaining tang 76 and outer cable retaining tangs 78. Center cable retaining tang 76 includes an edge 80 that is parallel with the leading and trailing edges 70 and 72 and outer cable retaining tangs 78 include edges 82 that are sloped in opposite directions at angle Θ1 away from leading edge 70. U-shaped slots 84 define outward extending tangs 86. For locking the blank 68 in place in order to form it into the cylindrical shaped cable retaining ring, an aperture 88 is provided in the blank 68. A tab 90 is provided on one end of the blank 68 which will align with a groove 92 on the opposite end of the blank 68 when the blank is formed into the cylindrical cable retaining ring 38. The outer tangs 78 include bend lines 94.

As shown in FIGS. 11 and 12, the level edge 80 on center cable retaining tang 76 and the sloped edges 82 on the outer cable retaining tangs 78 will act to force an inserted electrical cable (not shown) toward a point 96 on the inside of the cable retaining ring 38 that is opposite the center cable retaining tang 76. As shown in FIG. 12, the cable retaining tangs 76 and 78 include end portions 98 that are bent away at angle Θ2 from the base portion 99 of the center cable retaining tang 76. Preferably, end portions 98 of both center cable retaining tang 76 and end portions 98 of outer cable retaining tangs 78 are each bent at an angle Θ2 of between 20 and 30 degrees from the base portion 99 of the respective tang. Cable retaining tangs 76 and 78 are preferably each bent at an angle Θ3 of between 35 and 45 degrees from the sidewall 100 of the cable retaining ring 38.

Preferably the connector body 22 of the present invention is die cast of metal in one piece and most preferably constructed of ZAMAK™, a casting alloy comprised mainly of zinc alloyed with aluminum, magnesium, and copper and available from Eastern Alloys, Maybrook, N.Y. By constructing the tubular body of ZAMAK™ or other appropriate metals, the connector body 22 will be electrically conductive and provide good continuity throughout the fitting. The snap ring 34 and cable retaining ring 38 are preferably constructed of spring steel to impart toughness and flexibility to the various tangs located thereon. The electrical connector 20 is used to secure electrical cables such as metal clad (MC), metal clad all purpose (MCAP), flex cable, or continuous corrugated MC cables to a panel.

Figure 13:
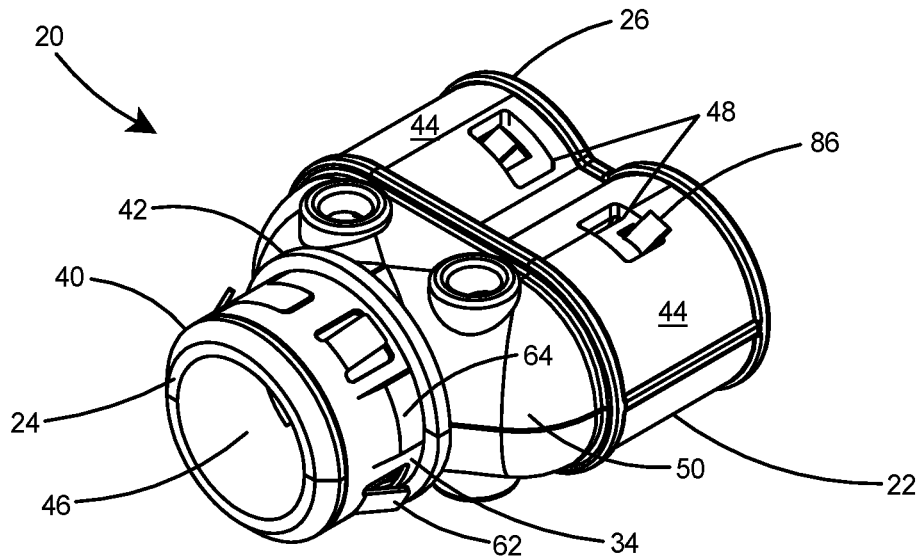
FIG. 13 is a perspective view of the duplex electrical connector of the present invention from the leading end of the connector.
Figure 14:
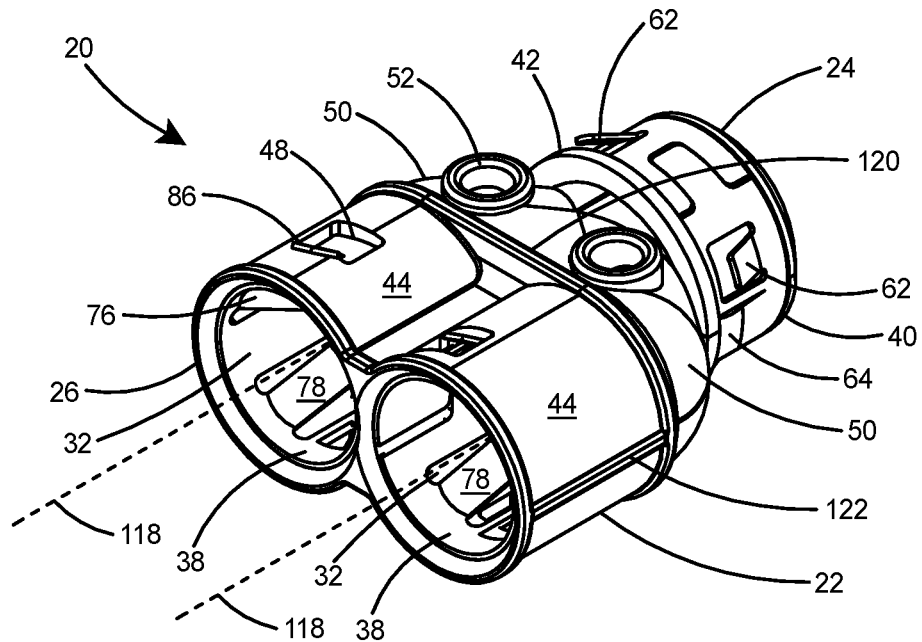
FIG. 14 is a perspective view of the duplex electrical connector of the present invention from the trailing end of the connector.

With reference to FIGS. 13 and 14, the assembled duplex electrical connector 20 with one-piece connector body 22 in a perspective view from the leading end 24 (FIG. 13) and a perspective view from the trailing end 26 (see FIG. 14). Snap ring 34, being 15 constructed of flexible spring steel, is expanded from its unbiased condition and slipped over end flange 40 after which it contracts to its unbiased condition and seats on the leading end 24 of the one-piece connector body 22. The cable retaining rings 38 in an unbiased condition are of a slightly larger diameter than the trailing bores 32 in the trailing end 26 of the connector body 22. To assemble the duplex connector 20, the cable retaining rings 38 are aligned such that the outward extending tangs 86 on the cable retaining rings 38 are in alignment with the openings 48 in the cylindrical walls 44 of the connector body 22. The cable retaining rings 38 are then compressed slightly and slipped into the respective bores 32 in the connector body 22. The assembled duplex 5 electrical connector 20 thus includes the one-piece die cast connector body 22 with a snap ring 34 securely seated on the leading end 24 and two cable retaining rings 38 securely seated within the bores 32 on the trailing end 26 of the connector body 22. The connector body 22 includes curved shoulders 50, an axis 118 through each of the trailing bores 32, a radially outward protruding rib 120 bordering the curved shoulder 50, and a longitudinal rib 122 extending substantially parallel to the axis 118 of the trailing bore 32.

Operation of the duplex electrical connector 20 of the present invention is very simple. As a result of the snap ring 34 on the leading end 24 of the connector body 22 and the cable retaining rings 38 in the trailing end 26 of the connector body 22, an installer simply pushes an electrical cable (not shown) into each of the bores 32 of the trailing end 26 of the duplex connector 20. The cable retaining tangs 76 and 78 in each bore 32 engage the electrical cable and hold the cable securely within the connector body 22. After the electrical cables are inserted, the leading end 24 of the duplex connector 20 is inserted within a knockout hole in a panel or junction box (not shown) and simply pushed until locking tangs 62 clear the wall of the panel or junction box and snap outward to their unbiased position. With locking tangs 62 sprung outward, the leading end 24 of the duplex connector 20 is held securely to the panel or junction box. As the connector body 22 is die cast in one piece and the snap ring 34 and cable retaining rings 38 are all constructed of metal, the duplex electrical connector 20 of the present invention establishes excellent electrical continuity between the electrical cables and the panel or junction box that it is secured to.

Prior to the present invention, conventional duplex connector bodies (not shown) with dual bores on the trailing end for accepting cable retaining rings were formed in two pieces as a method was not available for die casting the connector body in one piece. As shown in FIGS. 1 and 4, connector body 22 is die cast in one piece, including dividing wall portion 102 which is a portion of cylindrical wall portions 44 that form the bores 32 in the trailing end 26 of the connector body 22. The one piece die cast connector body 22 leads to the myriad advantages as described hereinabove in this specification including 50% savings in raw material cost per connector body, elimination of several expensive secondary manufacturing steps, elimination of flash on the interior 103 of the connector body, improvement of electrical continuity, and a reduction in the amount of tooling to produce the duplex connector body.

Figure 15:
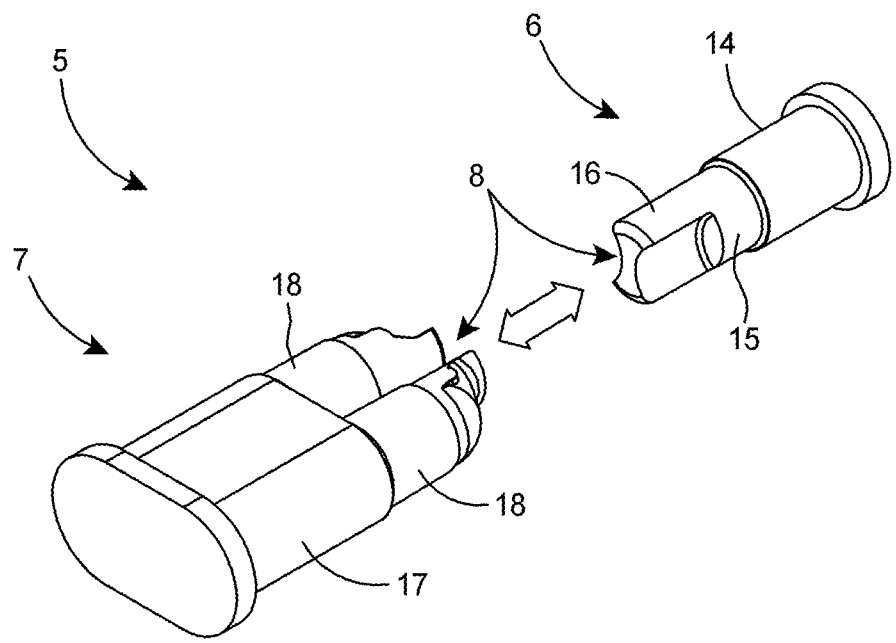
FIG. 15 is a side view of the duplex electrical connector of the present invention with cables inserted in the trailing end and with the leading end in alignment with a knockout aperture in a panel.

With reference to FIG. 15 there is shown a side view of the duplex electrical connector 20 of the present invention with electrical cables 104, one of which is in view, inserted in the trailing end 26 and with the leading end 24 in alignment with a knockout aperture 106 in an electrical panel 108. After electrical cables 104 are inserted into the trailing end 26 of the duplex connector 20, the leading end 24 is inserted through the knockout aperture 106 and advanced until locking tangs 62 clear the panel 108 and snap outward, thereby locking and securing the duplex connector 20 tightly and with excellent electrical continuity to the panel 108.

Figure 16:
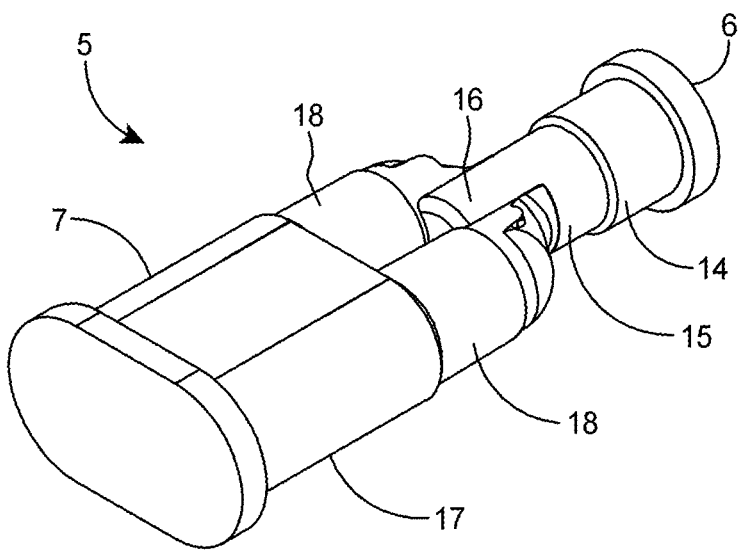
FIG. 16 is a side view of an alternate embodiment of the duplex electrical connector of the present invention with cables inserted in the trailing end and with the leading end in alignment with a knockout aperture in a panel.
Figure 17:
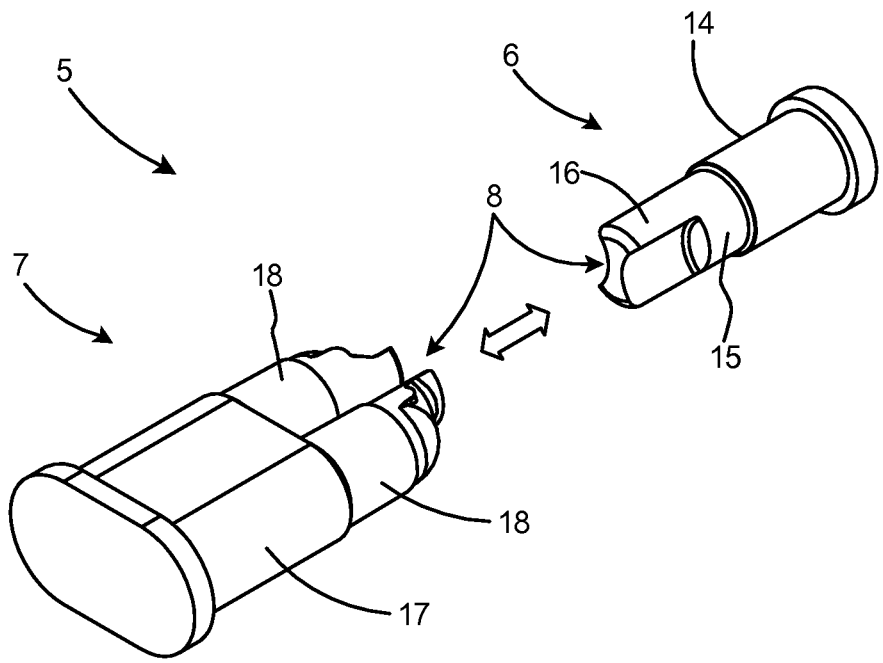
FIG. 17 is a perspective view of the coring system of the present invention including a first core and second core in alignment to be joined together in a die-cast process in order to form a one-piece connector body according to the present invention.
Figure 18:
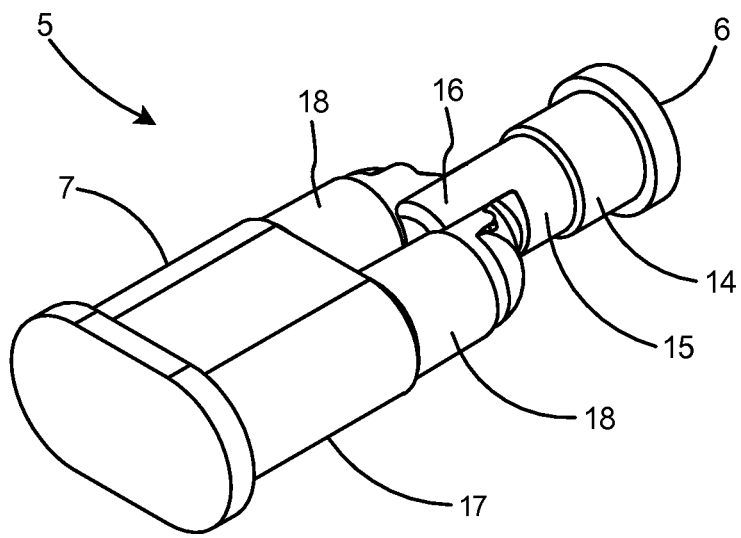
FIG. 18 is a perspective view of the coring system of the present invention depicting the first core and second core joined together to form a connector body having a flash-free interior passageway.
Figure 19:
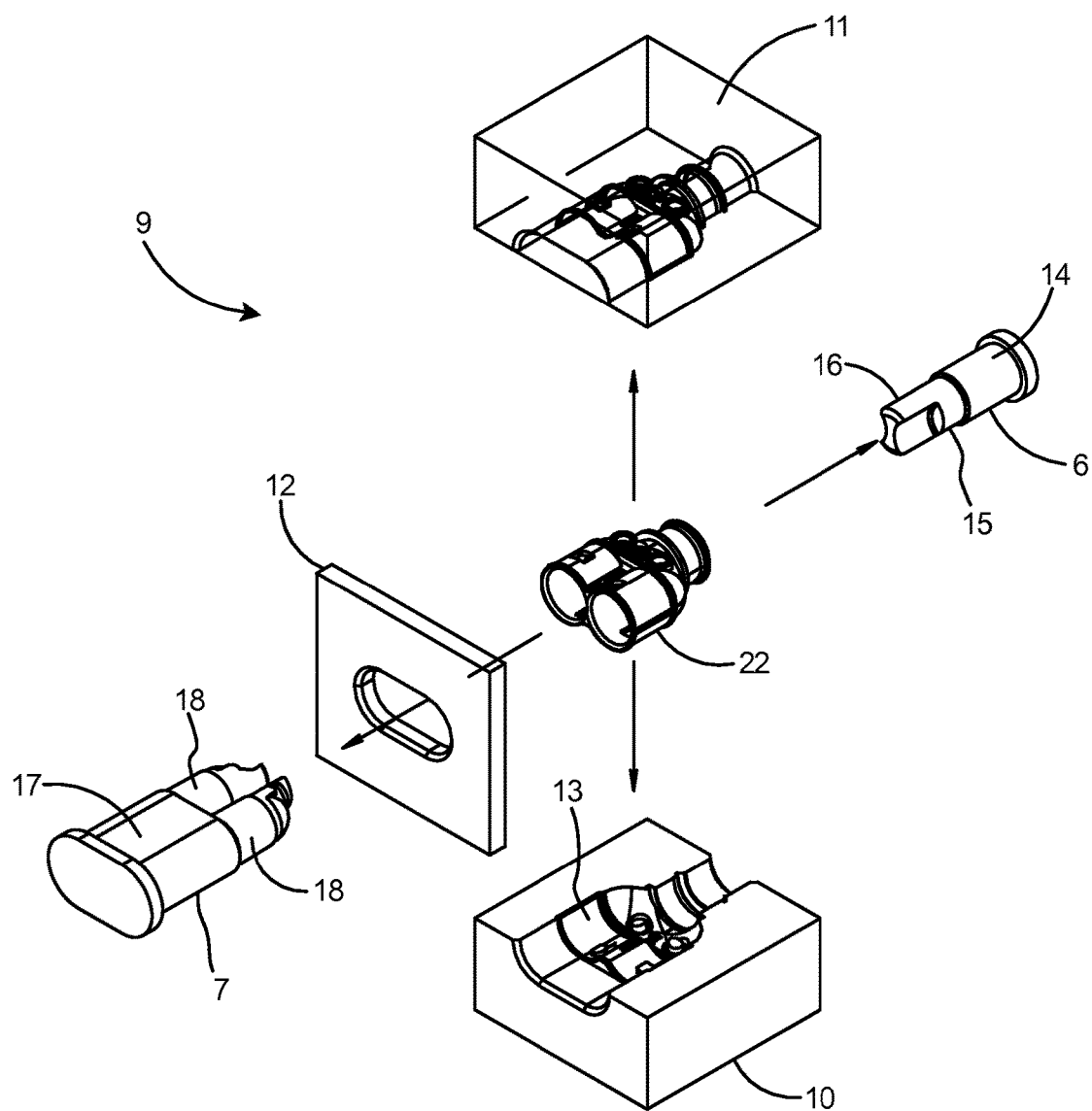
FIG. 19 is a conceptual view depicting a die-cast process including the coring system of the present invention.

Referring to FIG. 16 there is shown a side view of an alternate embodiment of the duplex electrical connector 110 of the present invention. The alternate embodiment of the duplex connector 110 includes a one-piece connector body 112 having threads 114 on the leading end 24. The duplex connector 110 is depicted with electrical cables 104 inserted in the trailing end 26 and with the leading end 24 in alignment with a knockout aperture 106 in a panel 108. Duplex electrical connector 110 is simply inserted through the knockout aperture 106 and a locknut 116 is threaded on the threads 114 at the leading end 24 of the connector to secure the connector 110 to the panel 108. The trailing end 26 of duplex electrical connector 110 is identical to the trailing end of the preferred embodiment and accepts electrical cables 104 in the same manner as the preferred embodiment.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. An electrical connector for connection of electrical cables to an electrical box comprising
   a one-piece substantially tubular connector body die cast of metal;
   said connector body including a leading end with an outlet bore and a trailing end with a pair of inlet bores;
   a fastening arrangement attached to said leading end for securing said electrical connector to said electrical box;
   an annular end flange that is tapered towards said leading end;
   said trailing end of said one-piece connector body including a dividing wall;
   said dividing wall including arcuate opposing surfaces that form a portion of said two inlet bores in said trailing end of said connector body, wherein each of said two inlet bores has an inner diameter that gradually decreases from a trailing end of said dividing wall to a leading end of said dividing wall;
   said trailing end of said connector body including a pair of substantially cylindrical wall portions defining said pair of inlet bores each including an axis and a shoulder portion between said leading end and said trailing end of said connector body;
   an annular intermediate flange bordering said shoulder portion;
   a nose portion between said end flange and said intermediate flange, said nose portion having a diameter smaller than said end flange and said intermediate flange, and being configured to receive a snap ring of said fastening arrangement;
   said inlet bores and said outlet bore joining in said shoulder portion having interior walls;
   a continuously arcuate transition longitudinally through the bores of said interior walls of said shoulder portion from said inlet bores to said outlet bore;
   a radially outward protruding rib on said connector body between said annular intermediate flange and said trailing end of said connector body, said radially outward protruding rib extending around the periphery of said connector body;
   a pair of longitudinal ribs on opposing sides of said connector body, said longitudinal ribs extending from said radially outward protruding rib to the trailing end of the connector body, each of said longitudinal ribs perpendicular to said radially outward protruding rib;
   flash-free walls extending continuously along the interior of said connector body in a converging direction from said trailing end to said leading end of said connector body configured to facilitate guided and uninterrupted paths;
   said dividing wall extends from said trailing end to said radially outward protruding rib bordering said shoulder portion, and the diameter of each said two inlet bores is larger at said trailing end than at said radially outward protruding rib; and
   a cable retaining ring secured in each of said inlet bores in said trailing end of said connector body.

2. The electrical connector of claim 1 wherein
   said trailing end of said connector body has a retaining arrangement for securing said cable retaining rings in each of said bores; and
   said retaining arrangement includes at least one opening in each of said substantially cylindrical wall portions in said trailing end of said connector body and at least one corresponding outwardly extending tang projecting on each of said cable retaining rings.

3. The electrical connector of claim 2 wherein
   each of said bores in said trailing end of said connector body is of a smaller diameter than said cable retaining ring;
   said cable retaining ring includes an unbiased state; and
   said cable retaining ring in said unbiased state is of a larger diameter than said diameter of said bore.

4. The electrical connector of claim 1 wherein
   said cable retaining ring is formed from a flat blank of spring steel having two ends;
   a first of said ends of said blank includes a tab;
   a second of said ends of said blank includes a groove therein; and
   said tab extends into said groove after said blank is formed into said cable retaining ring.

5. The electrical connector of claim 1 wherein said cable retaining ring includes one or more cable retaining tangs extending inward of said cable retaining ring.

6. The electrical connector of claim 1 wherein said snap ring includes one or more locking tangs extending outward from said snap ring; and one or more grounding tangs extending outward from said snap ring.

7. The electrical connector of claim 1 wherein said one-piece connector body is constructed of metal.

8. The electrical connector of claim 7 wherein said metal for forming said one-piece connector body is selected from the group including die cast metal alloy.

9. The electrical connector of claim 8 wherein said die cast metal alloy is zinc alloyed with aluminum, magnesium, and copper.

\* \* \* \* \*